March 24, 1959      S. J. FIELD      2,878,892
SELF-CLEANING FILTERS
Filed Sept. 21, 1955
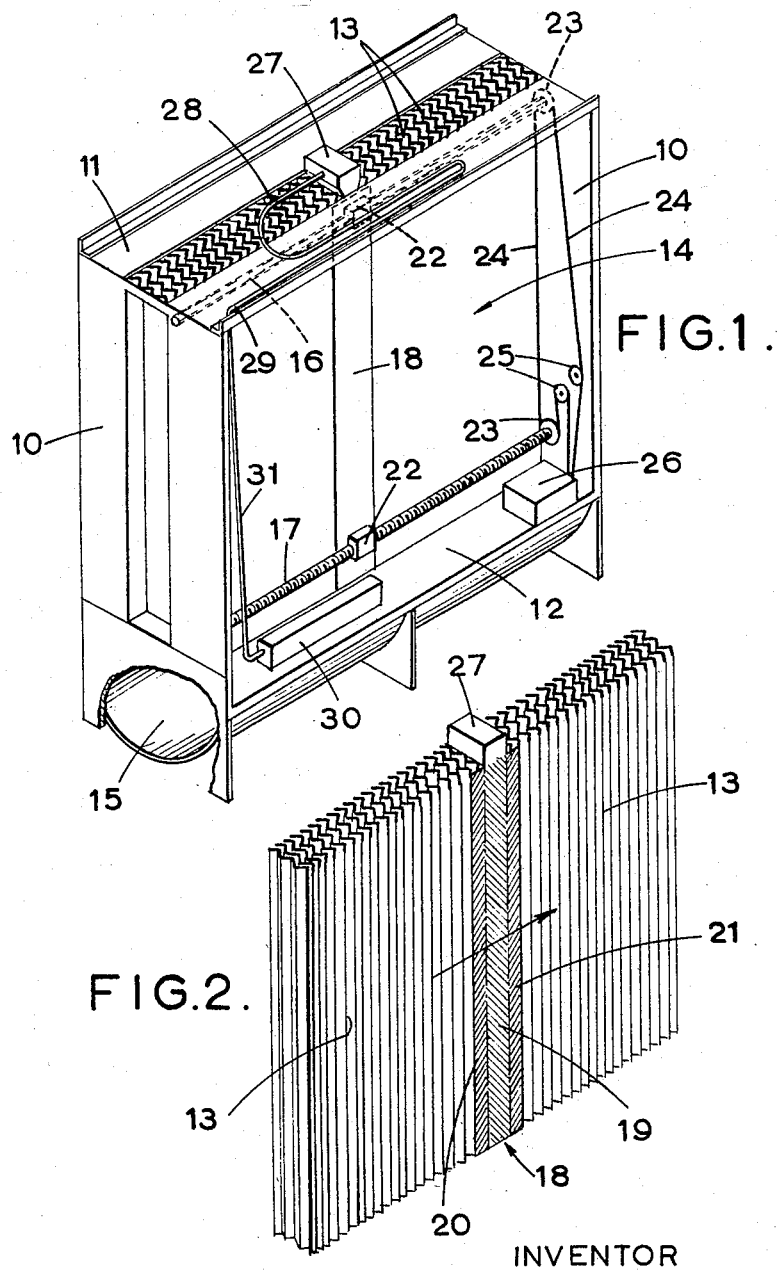
INVENTOR
SYDNEY JAMES FIELD
BY
ATTORNEY

United States Patent Office 2,878,892
Patented Mar. 24, 1959

2,878,892

SELF-CLEANING FILTERS

Sydney James Field, Rochester, England, assignor to Ozonair Engineering Company Limited, Rochester, England Application September 21, 1955, Serial No. 535,630

Claims priority, application Great Britain September 22, 1954

4 Claims. (Cl. 183—76)

This invention relates to filters for air or other fluids of the kind having an element such as a series of parallel plates of any section coated with a viscous liquid, past which the fluid stream is forced so that the solid particles therein are deposited and retained on the coated surfaces of the element, e.g., the plates.

It is an object of the invention to render such a filter self-cleaning by continuous operation, so that cleaning may take place over part of the filter without disturbing the remainder of the filter, and therefore a filter which is kept in operation continuously over long periods may be constantly kept clean, without either disturbance of its function, or interference with the filter element.

According to the invention, a self-cleaning filter of the kind described has a laterally traversable insolating or sealing curtain extending vertically over the height of the filter element, and of such breadth as to extend across a part of the element, horizontal guides located on the filter and co-operating with said isolating curtain to support it during its traverse across the filter, a container for distributing cleaning liquid located at the top of the isolating curtain and movable therewith, and means to supply the container with filtered cleaning liquid.

The means to supply the container comprises a pump collecting liquid from a sump extending across the lower end of the filter element, a strainer or filter, and a flexible connection leading to, and moving with, the container.

Conveniently, the isolating or sealing curtain is traversable by at least one lead screw, which is driven by chain and sprocket means.

According to the type of conditions to be met, the pump may if desired be located outside the filter proper, and there may be an isolating curtain on each side of the filter element.

One embodiment of the invention will be described with reference to the accompanying drawings, in which:

Figure 1 is a diagrammatic perspective view of a filter, and

Figure 2 is a diagrammatic fragmentary perspective view of the filter element.

Referring to the drawings the filter consists of a frame having vertical side members 10 and horizontal top and bottom members 11 and 12 respectively, defining a rectangular aperture 14 in which extend vertical plates 13 having vertically extending corrugations, the plates 13 being closely spaced and being arranged to have a viscous liquid passing downwardly by gravity over their surface into a sump 15. Such plates present sinuous channels to a current of air which is forced through the aperture 14, and pick up solid particles which attach themselves to the viscous liquid. The general arrangement of such a filter is well known.

To render the filter self-cleaning, there are arranged two horizontal lead screws 16, 17 extending across the top and bottom of the aperture 14 to act as guides for a curtain 18 capable of lateral movement to and fro across the aperture 14. The curtain 18 extends over the full height of the aperture 14 and thus blanks or seals off a number of the plates 13, and in any given position of the curtain 18 all the plates are operative and exposed to the air-stream, except those plates immediately adjacent to the curtain. The width of the curtain depends on the design of the filter and the circumstances of the installation, but the curtain is regarded as having a central vertical zone 19 termed the flooding area, and two side zones 20, 21 which may be termed the blanking sealing area and the draining area, respectively, according to the circumstances. The flooding area 19 has a width slightly less than one-third the total width of the curtain 18. The width of the draining area 20 or 21 depends on the viscosity of the fluid being circulated and the time required to drain the fluid from the plates 13 to prevent fluid carry-over when ultimately subject to the velocity of the air-stream. As an example, the curtain may be of such a total width as to shield or cover about 25 of the vertical corrugated plates 13.

Cooperating with its lead screws 16, 17, to hold it vertical while it is moved across the aperture 14, the curtain 18 has two threaded blocks 22 attached thereto at the top and bottom. The lead screws carry sprockets 23 around which run an endless chain 24 having jockey sprockets 25 and operatively connected with an electric motor and reduction gear unit 26. By this means the curtain 18 may be traversed from one side to the other of the aperture 14, between the two vertical side members 10 and may thus isolate successively all the plates of the filter.

The lead screws 16, 17 may be rotated at such speed as to give the curtain 18 a horizontal movement to provide adequate flooding and draining periods, according to the amount of dirt to be washed from the filter plates.

When this invention is applied to a filter for continuous operation, means are provided to reverse electrically the rotation of the reduction unit 26 each time the curtain reaches the end of its horizontal travel. Alternatively, the horizontal traverse may be hand controlled.

At the top of the isolating or sealing curtain 18, there is arranged a container 27 which conveniently has a fluid discharge width equal to the width of the flooding area 19 and a length equal to the breadth of the plates of the filter, the container 27 being supplied with the viscous fluid through a flexible connection 28 from a fixed supply point 29 at the top of the filter. The container 27 may thus be continuously charged irrespective of the position of the isolating curtain 18.

The sump 15 at the bottom of the filter plates 13 is arranged to collect the viscous fluid falling from the plates, and a level is maintained to provide an air seal at the bottom of the plates 13. Beside one of the vertical side members 10 there is provided a unit 30 comprising a pump and filter, whereby the viscous fluid falling by gravity into the sump 15 is drawn therefrom and filtered and passed back through a pipe 31 to the container 27. If desired, the unit 30 may be located externally of the apparatus, and fed from the sump 15.

It has already been stated that the central zone 19 of the isolating curtain 18 is termed the flooding area, and the side zones 20, 21 are termed the blanking and draining areas, respectively. These two latter terms depend in operation on the direction of traverse of the isolating curtain 18. The leading zone of the curtain 18 is always the blanking sealing area, while the trailing zone is always the draining area, and it will be seen that these functions are reversed on every reversal of motion of the panel.

In operation, the curtain 18 is traversed continuously from side to side and the container 27 is supplied with filtered viscous fluid. The bottom surface of the container 27 is formed with a suitable baffle so arranged that a predetermined volume of the viscous fluid falls therethrough on to the plates immediately beneath. The speed of traverse, capacity of the container 27, dimensions of the width of the panel, and volume of viscous fluid fed, depend on the size and other characteristics of the particular installation. At any given moment, however, assuming the curtain to be moving in the direction of the arrow in Figure 2, the leading side 21 of the curtain 18 functions as a blanking area, and blanks or seals off the air-stream from about nine of the vertical plates. Immediately following this, viscous liquid is discharged from the container 17 on to these plates, which were of course previously behind the blanking area 21, but are now behind the flooding area 19 due to the movement of the isolating or sealing curtain.

As the curtain moves on, these plates are then behind the draining area 20 (the trailing part of the panel) and the fluid falls by gravity to the sump 15, the speeds of the curtain and passage of the liquid being so arranged that by the time the curtain 18 has again exposed any given plate to the air-stream, the plate has been flushed and become coated with clean viscous fluid. Each plate 13 is therefore flushed by flooding, and coated with clean viscous fluid each time the curtain passes in front of it, and a complete continuity of operation of the filter is assured.

The provision of self-cleaning means according to the invention is quite independent of the configuration of the plates 13, which is flat, or of other shape, if desired. Further, although the cleaning fluid has been described as viscous, fluids of low viscosity, such as water, is employed, the dimensions and speed of traverse of the curtain being arranged accordingly.

I claim:

1. A self-cleaning fluid-filter including a filter element which comprises a series of plates coated with cleaning fluid, said plates extending vertically and being spaced apart to allow the horizontal passage of the fluid to be filtered, a laterally traversable isolating curtain of material impervious to said fluid and said liquid, said curtain extending vertically over the height of said element and of such breadth as to extend laterally across part of said element, said curtain being in blanking off contact with vertical edges of those plates to which it is, for the time being, adjacent, horizontal guides located on the filter and cooperating with said curtain to support it during its traverse across the filter, a container for distributing said cleaning liquid, said container being located at the top of said curtain, movable therewith, and blanking off contact with the top edges of the adjacent filter element plates, a sump for said cleaning fluid extending across the lower end of the filter element and accommodating the bottom ends of said plates, and means for collecing said cleaning liquid from said sump, filtering it and delivering it to said container, said means for collecting said cleaning liquid from said sump comprising a pump located outside the filter proper.

2. A self cleaning vertical air filter adapted for a vertical flow of cleaning fluid and a horizontal flow of gas to be cleaned having a plurality of closely spaced parallel vertical plates having surfaces coated with a viscous liquid so that solid particles to be filtered will be deposited upon and retained by the coated surfaces of the parallel plates, means to admit liquid to the tops of the plates to flow down over the plates and means to receive liquid from the bottoms of the plates after it has flowed down along the plates, said filter being self cleaning by continuous operation, so that cleaning takes place over part of the filter without disturbing the remainder of the filter, said filter having a laterally transversable curtain extending vertically over the height of the filter but only part way laterally across the filter to blank off a part of the curtain to permit cleaning, means to move said curtain laterally backwardly and forwardly across said plates, and horizontal guides located at the top and bottom cooperating with and supporting said curtain during its traverse movement.

3. The filter of claim 2, a container positioned to move with the curtain above the plates, to supply the liquid, means to supply liquid to the container including a pump, a sump extending across the lower end of the filter, a liquid connection from said sump to said pump, a strainer on said liquid connection, said container being mounted on the top of the curtain and a flexible connection for liquid leading to and moving with said container.

4. A self cleaning fluid filter adapted for a vertical flow of cleaning liquid and a horizontal flow of cleaning gas having a vertical frame with vertical side members and horizontal top and bottom members defining a rectangular aperture, vertically extending conforming closely spaced corrugated filter plates presenting sinuous channels to the passage of an air current forced horizontally transversely across the aperture, a movable curtain moving laterally to and fro across the side edges of the plates and blanking off the sinuous passages through a number of said plates while said plates are being cleaned by a cleaning liquid, horizontally extending lead screws extending across the top and bottom of the filter to give the curtain reciprocating lateral movement across the filter, a container mounted to move with the curtain positioned above and having a discharge outlet extending across the plates blanked out by the curtain discharging a viscous cleaning liquid onto said blanked out plates, a sump at the bottom of the filter to collect the excess viscous cleaning liquid and means to filter the liquid and supply it back to the container.

References Cited in the file of this patent

UNITED STATES PATENTS

| | | |
|---|---|---|
| 1,807,950 | Adams et al. | June 2, 1931 |
| 1,895,618 | Fedeler | Jan. 31, 1933 |